W. G. VON STADEN.
Car Frames.
No. 5,482.
Reissued July 8, 1873.
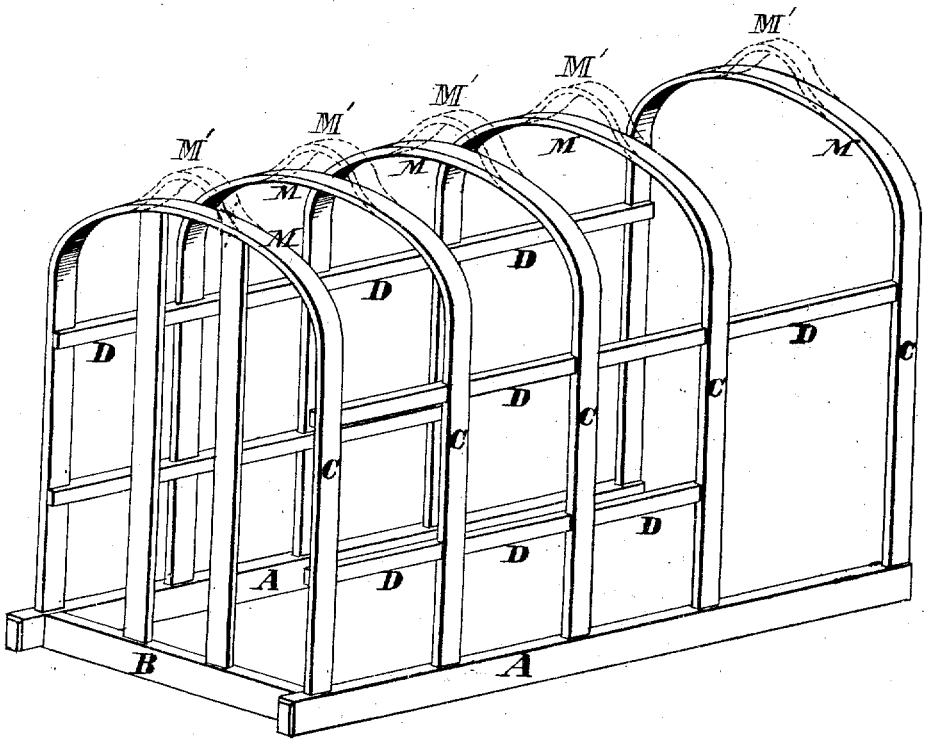
WITNESSES:
Jno. L. Ewin
Walter Allen
INVENTOR:
Wilhelm Gabriel Von Staden
By Knight Bros Attorneys.

UNITED STATES PATENT OFFICE.

WILHELM GABRIEL VON STADEN, OF STRATHROY, CANADA.

IMPROVEMENT IN CAR-FRAMES.

Specification forming part of Letters Patent No. 131,725, dated September 24, 1872; reissue No. 5,482, dated July 8, 1873; application filed May 24, 1873.

*To all whom it may concern:*

Be it known that I, WILHELM GABRIEL VON STADEN, of Strathroy, in the county of Middlesex, Province of Ontario and Dominion of Canada, wood bender, have invented certain Improvements in the Construction of the Body-Frames of Railway Cars, of which the following is a specification:

My invention consists in constructing the body-frames of freight or passenger cars with vertical posts mortised at bottom in the horizontal sills of the car-frame, and bent at top to form the bow of the roof, each pair of posts with their connecting bow being constructed of one piece of wood, as hereinafter more fully set forth.

The drawing represents, in perspective, the body-frame of a car illustrating my invention.

A A are the ordinary string-beams of a car-frame, resting on the trucks and mortised to end pieces B in the usual manner to carry the body of the car. C are a series of any required number of my improved ribs, each constructed or formed of one piece of timber steamed and bent to the required shape to form the upright side posts and curved rafters of the roof. These ribs are set upright transversely at the required distance apart, the foot of each leg of the rib being mortised into the string-beams A, or otherwise secured thereto. These ribs C are held connectedly by horizontal side pieces D framed and secured thereto. The construction of the car is then proceeded with in the ordinary manner.

By the use and employment of ribs thus formed and arranged it is believed that the body of a car can be built more cheaply and be more durable than when the frame is constructed without such bent ribs.

I have shown in dotted lines an additional bend, M′, which it is preferred to form in the bow M in constructing frames for passenger-cars, the said supplemental bends forming the dome of the roof. Each pair of posts and their connecting bow M, either with or without the supplemental bend M′, may be made in a single piece of bent wood.

A car constructed with my improved frame will also be stronger, of less weight, and less liable to splinter or fracture in case of collision, as the fiber of the ribs does not run transversely through at any part of the curve.

As the fiber of the wood follows the curve of the rafter, these rafters are not liable to split or check, and will bear a greater external weight than if the rafter was sawn to the required shape in the usual manner.

What I claim as my invention is—

The posts and bow C C M formed in one piece of bent wood, secured at bottom to the sills A, and braced by longitudinal bars D, substantially as herein set forth.

To the above specification I hereunto set my hand this 25th day of March, 1873.

W. G. VON STADEN.

Witnesses:

OCTAVIUS KNIGHT,
WALTER ALLEN.